(12) United States Patent
Taniguchi et al.

(10) Patent No.: US 7,247,839 B2
(45) Date of Patent: Jul. 24, 2007

(54) ENCODER FOR DETECTING POSITION OR DISPLACEMENT OF MOVING BODY

(75) Inventors: Mitsuyuki Taniguchi, Gotenba (JP); Hirofumi Kikuchi, Minamitsuru-gun (JP); Hiromichi Horiuchi, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 228 days.

(21) Appl. No.: 11/002,665

(22) Filed: Dec. 3, 2004

(65) Prior Publication Data

US 2005/0122237 A1 Jun. 9, 2005

(30) Foreign Application Priority Data

Dec. 9, 2003 (JP) ............................. 2003-410857

(51) Int. Cl.
*G01D 5/34* (2006.01)

(52) U.S. Cl. ................................ 250/231.16; 250/208.2

(58) Field of Classification Search .............................
250/231.13–231.18, 559.29, 555; 356/399–401;
341/9, 13
See application file for complete search history.

(56) References Cited

U.S. PATENT DOCUMENTS

| | | | |
|---|---|---|---|
| 5,952,824 A | 9/1999 | Shinjo et al. | |
| 6,038,523 A | 3/2000 | Akahane et al. | |
| 6,080,983 A * | 6/2000 | Waczynski | 250/231.16 |
| 6,215,426 B1 * | 4/2001 | Taniguchi | 341/115 |
| 2003/0160160 A1 * | 8/2003 | Taniguchi | 250/231.13 |

FOREIGN PATENT DOCUMENTS

| | | |
|---|---|---|
| DE | 197 33 904 | 8/1998 |
| EP | 1 024 348 | 8/2000 |
| EP | 1 103 790 | 5/2001 |
| JP | 57-198809 | 12/1982 |
| JP | 58-030671 | 2/1983 |
| JP | 03-162622 | 7/1991 |
| JP | 10-191553 | 7/1998 |
| JP | 11-142182 | 5/1999 |
| JP | 2000-258481 A | 9/2000 |

* cited by examiner

*Primary Examiner*—Thanh X. Luu
*Assistant Examiner*—Tony Ko
(74) *Attorney, Agent, or Firm*—Drinker Biddle & Reath LLP

(57) ABSTRACT

An encoder that can detect the presence of noise occurring within the encoder. The encoder is constructed by incorporating within the same apparatus: a movement detecting unit for detecting the movement of a moving body; a signal processing circuit for processing a movement detection signal supplied from the movement detecting unit, and thereby producing an encoder signal representing the position and/or the amount of displacement of the moving body; and a noise detecting unit for detecting noise superimposed on the movement detection signal. According to this encoder, a noise voltage generated within the encoder via a stray capacitance is detected within the encoder and is output as noise data, so that the noise level can be detected without requiring the use of an external measuring device. Further, by outputting encoder data and noise data occurring at the same instant in time, the reliability of the encoder data can be judged based on the condition of the noise level.

13 Claims, 9 Drawing Sheets

UTILIZES REFERENCE VOLTAGE (CONSTANT VOLTAGE) USED IN CIRCUIT

AC COMPONENT AS NOISE COMPONENT IS EXTRACTED BY AC COUPLING AND IS AMPLIFIED

ENCODER FOR DETECTING POSITION OR DISPLACEMENT OF MOVING BODY

BACKGROUND OF THE INVENTION

1. Field of the Invention

The present invention relates to an encoder such as a rotary encoder, a linear scale, and the like, and, more particularly, to an encoder that can output the information of noise level.

2. Description of the Related Art

Encoders are well known in the prior art as devices for detecting the moving position or the amount of displacement of a moving body, and can be roughly classified into two types: rotary encoders are encoders that detect the angle of rotation or the amount of rotation; and linear scales are encoders that detect the position or the amount of displacement from a reference position along a path.

Generally, an encoder is mounted on the housing of a driving device such as a motor that drives a moving body. An encoder contains a circuit board, and a signal processing circuit is mounted on this circuit board. Usually, there is no direct electrical connection between the circuit board contained in the encoder and the housing on which the encoder is mounted, but they are electrically connected indirectly via a stray capacitance.

In this case, if a potential variation due to noise, etc. occurs on the housing side, the encoder circuit may be affected via the stray capacitance, to cause an error in the position data or displacement amount data that the encoder outputs.

Figure 11:
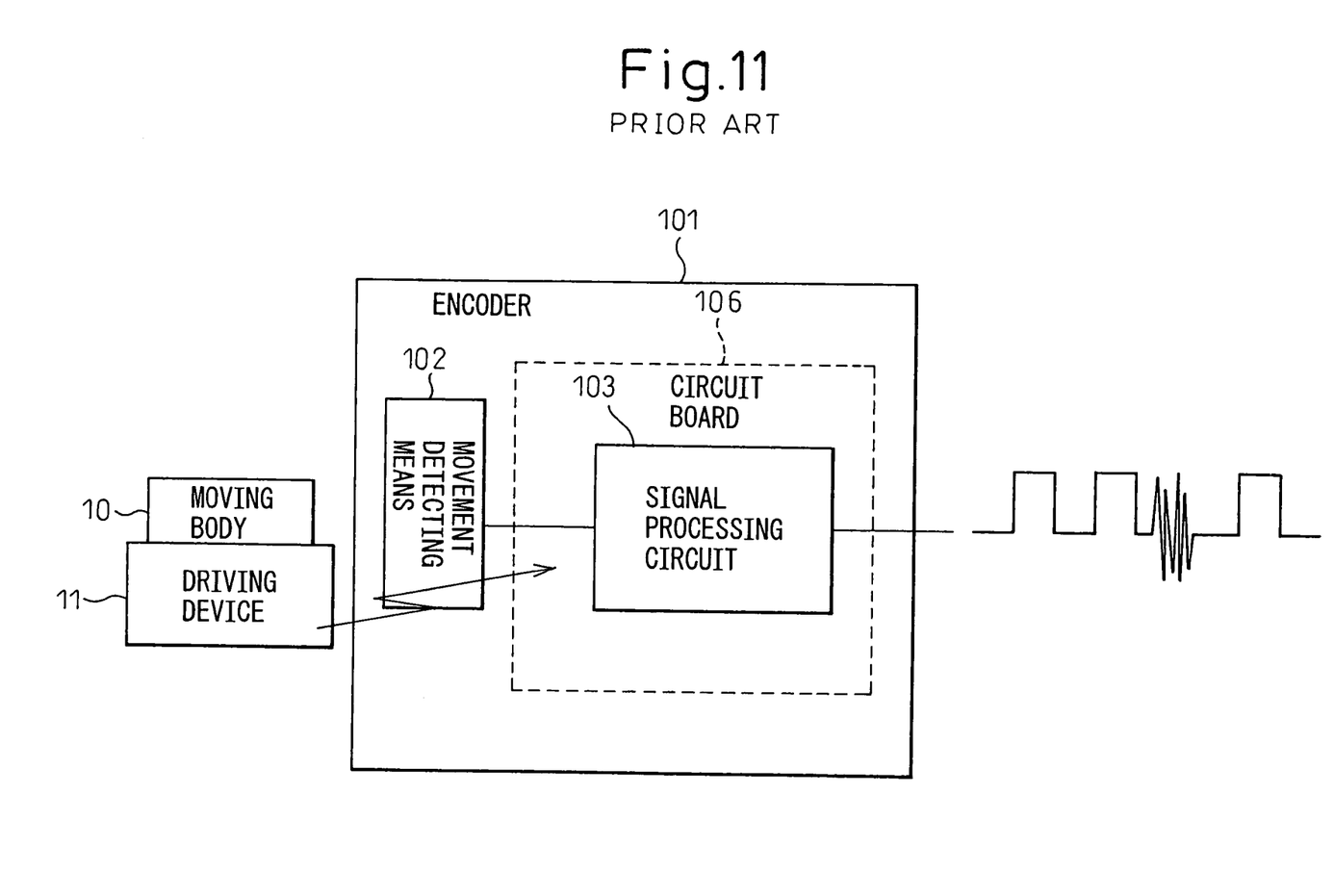
FIG. 11 is a schematic diagram for explaining a prior art encoder.

FIG. 11 is a schematic diagram for explaining a prior art encoder. In FIG. 11, the encoder 101 comprises a movement detecting means 102 for detecting the movement of a moving body 10 and a signal processing circuit 103 for generating an encoder signal by processing the movement detection signal supplied from the movement detecting means 102; here, the signal processing circuit 103 is mounted on a circuit board 106.

The movement of the moving body 10 driven by a driving device 11 such as a motor is detected by the movement detecting means 102, and the encoder signal is generated by the signal processing circuit 103.

Figure 12:
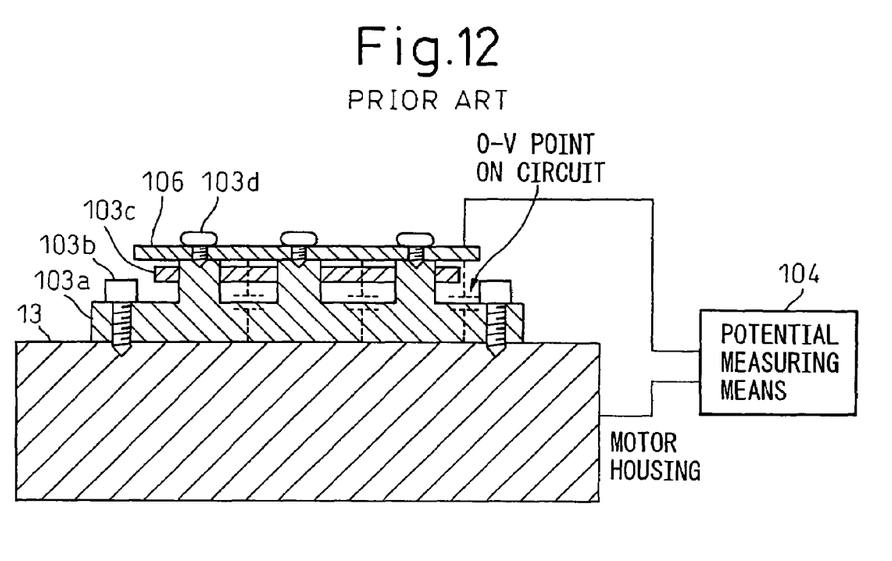
FIG. 12 is a schematic diagram for explaining how the prior art encoder is mounted on a housing.

FIG. 12 is a schematic diagram for explaining how the prior art encoder is mounted on a housing. The encoder is mounted on the housing 13 of the driving device (hereinafter referred to as the motor) via an encoder flange 103a provided on the encoder. The encoder flange 103a is fixed to the motor housing 13 with flange fixing screws 103b, and the circuit board 106 is fixed to the encoder flange 103a with circuit board fixing screws 103d. Here, a rotating slit 103c is mounted between the circuit board 106 and the encoder flange 103a.

Figure 13:
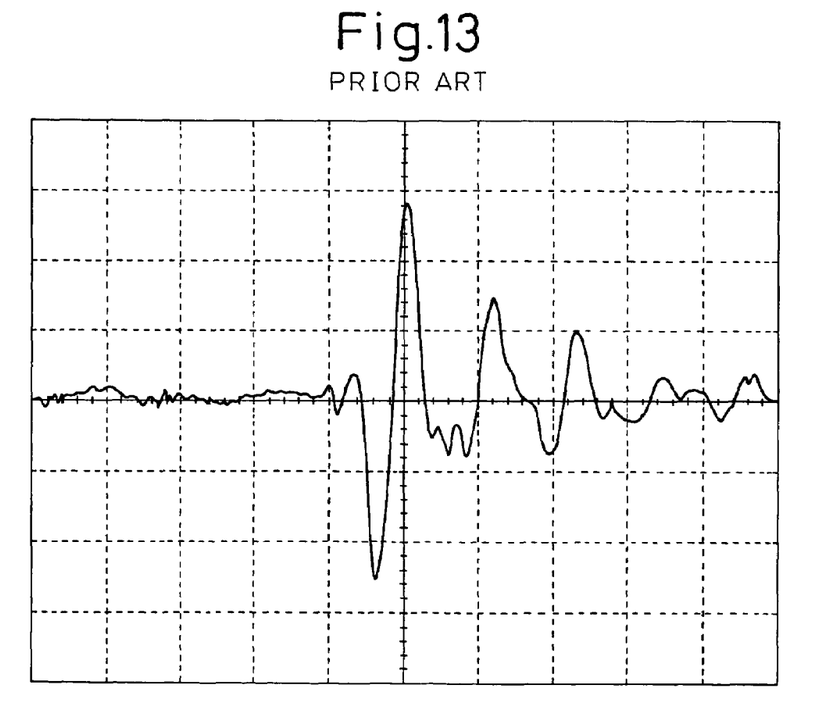
FIG. 13 is a diagram showing one example of noise occurring in a motor housing.

FIG. 13 shows one example of noise occurring in the motor housing. In the prior art, as shown in FIG. 12, for example, the noise is measured by directly measuring a noise potential with a potential measuring means 104 connected between the motor housing 13 and a 0-volt point on the circuit. The measured noise potential is used to take remedial measures against the noise based on the level of the noise potential.

Further, as a technique for detecting noise contained in the encoder signal, it is known to detect noise introduced in an encoder line along which the encoder signal is sent to the control unit (refer to Japanese Unexamined Patent Publication No. 2000-258481).

There is no direct electrical connection between the signal processing circuit in the encoder and the housing on which the encoder is mounted, but they are electrically connected indirectly via a stray capacitance.

Accordingly, if the motor is not properly grounded, noise (potential difference) occurs in the housing. This noise may affect the encoder circuit via the stray capacitance, causing an error in the position data or displacement amount data that the encoder produces.

In the prior art, the potential of the motor housing is directly measured using a measuring device, and remedial measures are taken to reduce the noise by making a judgment based on the noise level obtained through the measurement.

The technique for measuring the noise introduced in the encoder line connecting between the encoder and the control unit is known in the above-cited Japanese Unexamined Patent Publication No. 2000-258481, but the technique disclosed in the above-cited document is one that addresses communication system-related noise, and therefore, cannot measure the noise occurring within the encoder.

As the noise occurring within the encoder is included in the encoder signal itself, it is not possible to discriminate the noise from the signal representing the position data or displacement amount data of the moving body and, once output on the encoder line, the noise cannot be measured with the technique disclosed in Japanese Unexamined Patent Publication No. 2000-258481.

SUMMARY OF THE INVENTION

It is an object of the present invention to solve the above prior art problem and provide an encoder that can detect the presence of noise occurring within the encoder.

According to the encoder of the present invention, a noise voltage generated within the encoder via a stray capacitance is detected within the encoder and is output as noise data, so that the noise level can be detected without requiring the use of an external measuring device.

Further, by outputting encoder data and noise data occurring at the same instant in time, the reliability of the encoder data can be judged based on the condition of the noise level.

The encoder of the present invention is constructed by incorporating within the same apparatus: movement detecting means for detecting the movement of a moving body; a signal processing circuit for processing a movement detection signal supplied from the movement detecting means, and thereby producing an encoder signal representing the position and/or the amount of displacement of the moving body; and noise detecting means for detecting noise superimposed on the movement detection signal.

In a first embodiment of the noise detection performed by the noise detecting means, the noise superimposed on the movement detection signal is extracted from the movement detection signal supplied from the movement detecting means, and the noise level of the extracted noise is detected.

In the first embodiment, the noise detecting means extracts the signal by connecting a coupling capacitor to a signal line connecting between the movement detecting means and the signal processing circuit. By interposing the coupling capacitor, an AC component can be extracted from the movement detection signal flowing along the signal line.

In a second embodiment of the noise detection performed by the noise detecting means, noise induced in a circuit board on which the signal processing circuit is mounted is extracted, and the noise level of the extracted noise is detected.

In the second embodiment, the noise detecting means extracts the signal by connecting a coupling capacitor to an arbitrary signal line on the circuit board. By interposing the coupling capacitor, an AC component can be extracted from the signal output on the signal line.

The signal flowing along the signal line contains a DC component and an AC component; the DC component represents the moving condition of the moving body, and the AC component represents the noise condition. Accordingly, in the first and second embodiments, by extracting the AC component via the coupling capacitor, the noise component can be detected.

The encoder includes an A/D conversion circuit for obtaining the noise level from the extracted AC component.

The encoder of the present invention further comprises transmitting means so that the output of the noise detecting means and/or the output of the signal processing circuit can be transmitted to a control unit for a driving device that drives the moving body.

The output of the noise detecting means and the output of the signal processing circuit are data occurring at the same instant in time. Accordingly, when a noise component is detected in the output of the noise detecting means, it can be determined that the noise component is also superimposed on the output of the signal processing circuit transmitted at the same instant in time.

The encoder of the present invention can also be constructed by connecting a capacitor between the circuit board and the driving device that drives the moving body. By connecting the capacitor between the circuit board and the driving device such as a motor, only the AC component of the potential occurring in the driving device can be transmitted to the circuit board. The thus connected capacitor forms a parallel circuit with a stray capacitance between the circuit board and the driving device, and transmits the AC component of the potential occurring in the driving device to the circuit board.

By connecting the capacitor, the accuracy of the detection performed by the noise detecting means can be enhanced.

Alternatively, a noise amount detecting circuit may be connected between the circuit board and the driving device that drives the moving body.

The movement detecting means can make use of an optical detection system, and can be constructed using a light emitting device, a code disk which transmits or reflects light emitted from the light emitting device, and a light receiving device which receives the light transmitted through or reflected by the code disk and outputs a light detecting signal.

The movement detecting means may includes a light receiving device for measuring noise level; by using the output of the noise-level-measuring light receiving device, the level of the noise component only can be calculated.

According to the encoder of the present invention, the presence of noise occurring within the encoder can be detected.

BRIEF DESCRIPTION OF THE DRAWINGS

Further features and advantages of the present invention will be apparent from the following description with reference to the accompanying drawings, in which.

DETAILED DESCRIPTION

An encoder according to the present invention will be described below with reference to the drawings.

Figure 1:
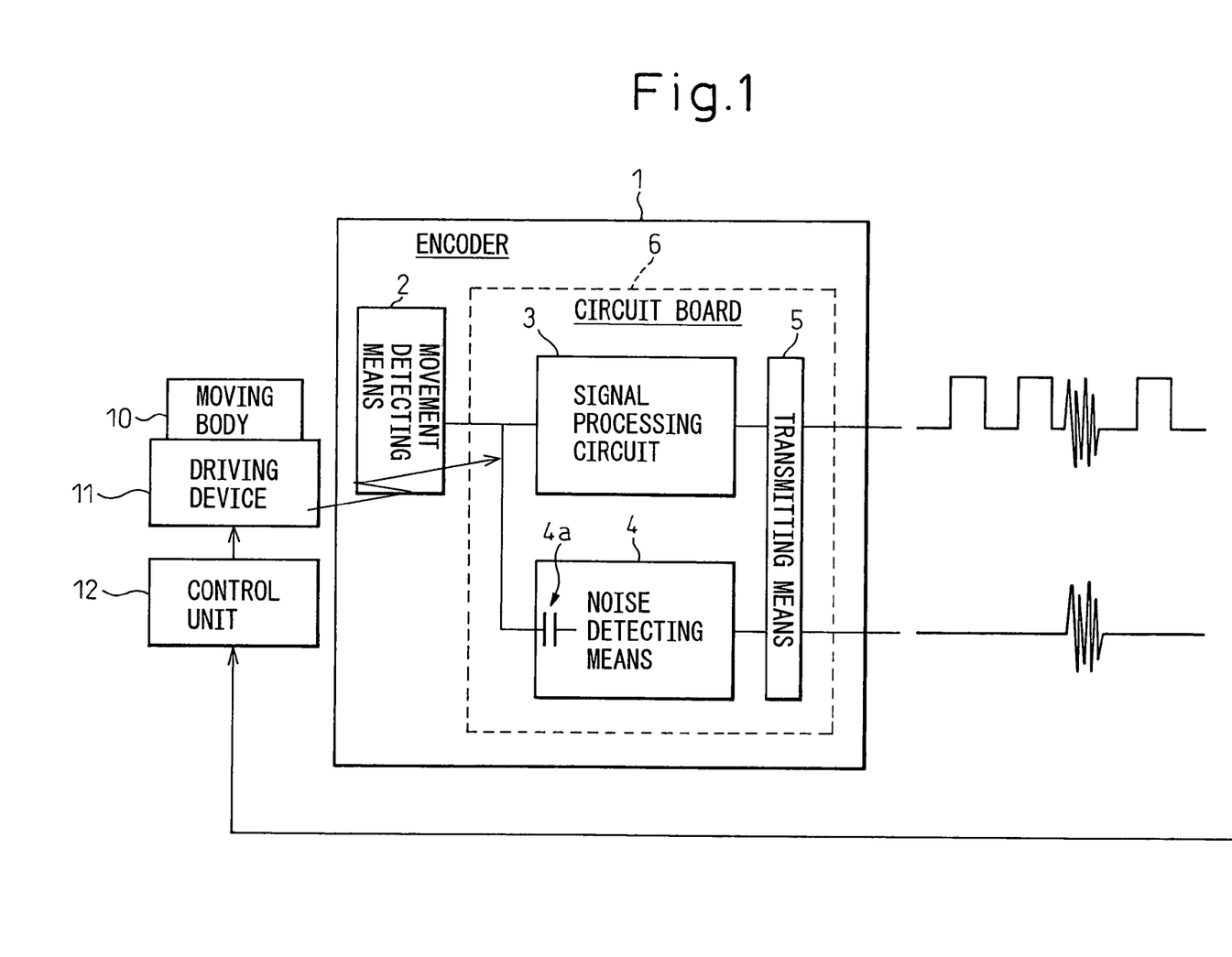
FIG. 1 is a schematic diagram for explaining a first embodiment of an encoder according to the present invention.
Figure 2:
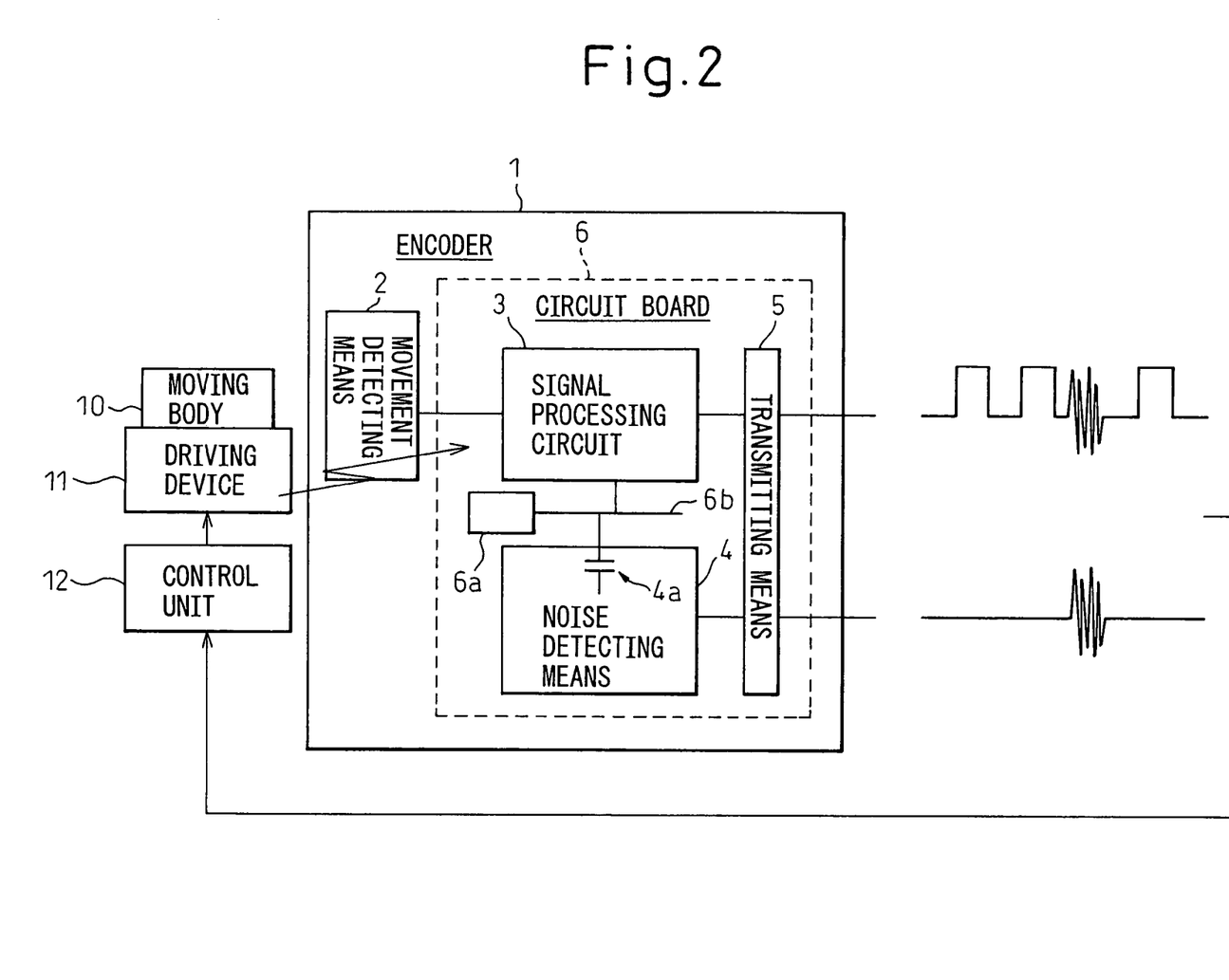
FIG. 2 is a schematic diagram for explaining a second embodiment of an encoder according to the present invention.

FIG. 1 is a schematic diagram for explaining a first embodiment of an encoder according to the present invention, and FIG. 2 is a schematic diagram for explaining a second embodiment of an encoder according to the present invention.

In the first embodiment of the encoder shown in FIG. 1, the encoder 1 comprises a movement detecting means 2 for detecting the movement of a moving body 10, a signal processing circuit 3 for outputting an encoder signal by processing the movement detection signal supplied from the movement detecting means 2, and a noise detecting means 4 for detecting a noise component contained in the movement detection signal; here, the movement detection signal is introduced into the noise detecting means 4 through a coupling capacitor 4a. By interposing the coupling capacitor 4a, the noise detecting means 4 detects the noise by extracting only the noise component contained in the movement detection signal.

On the other hand, in the second embodiment of the encoder shown in FIG. 2, the encoder 1 comprises a movement detecting means 2 for detecting the movement of a moving body 10, a signal processing circuit 3 for outputting an encoder signal by processing the movement detection signal supplied from the movement detecting means 2, and a noise detecting means 4 for detecting a noise component contained in the movement detection signal; here, the signal flowing along a line 6b formed on the circuit board 6 on which the signal processing circuit 3 is mounted is introduced into the noise detecting means 4 through a coupling capacitor 4a. By interposing the coupling capacitor 4a, the noise detecting means 4 detects the noise by extracting only the noise component contained in the signal flowing along the line 6b formed on the circuit board 6.

An arbitrary line formed on the circuit board 6 can be selected as the line 6b; here, by selecting a line that allows the detection of a constant voltage, for example, a line connected to a reference voltage 6a, the variation of the noise component can be detected stably.

The moving body 10 is driven by a driving device 11 such as a motor, and the driving device 11 is controlled by a control unit 12. The control unit 12 controls the driving device 11 to control position, speed, etc. in response to the encoder signal acquired and fed back by the encoder 1. The feedback of the encoder signal is performed using a transmitting means 5 provided in the encoder 1. The transmitting means 5 can feed back to the control unit 12 not only the encoder signal output from the signal processing circuit 3 but also the noise data signal detected by the noise detecting means 4. The control unit 12 can determine, based on the fed back noise data signal, the presence or absence of a noise component in the encoder signal.

Figure 3:
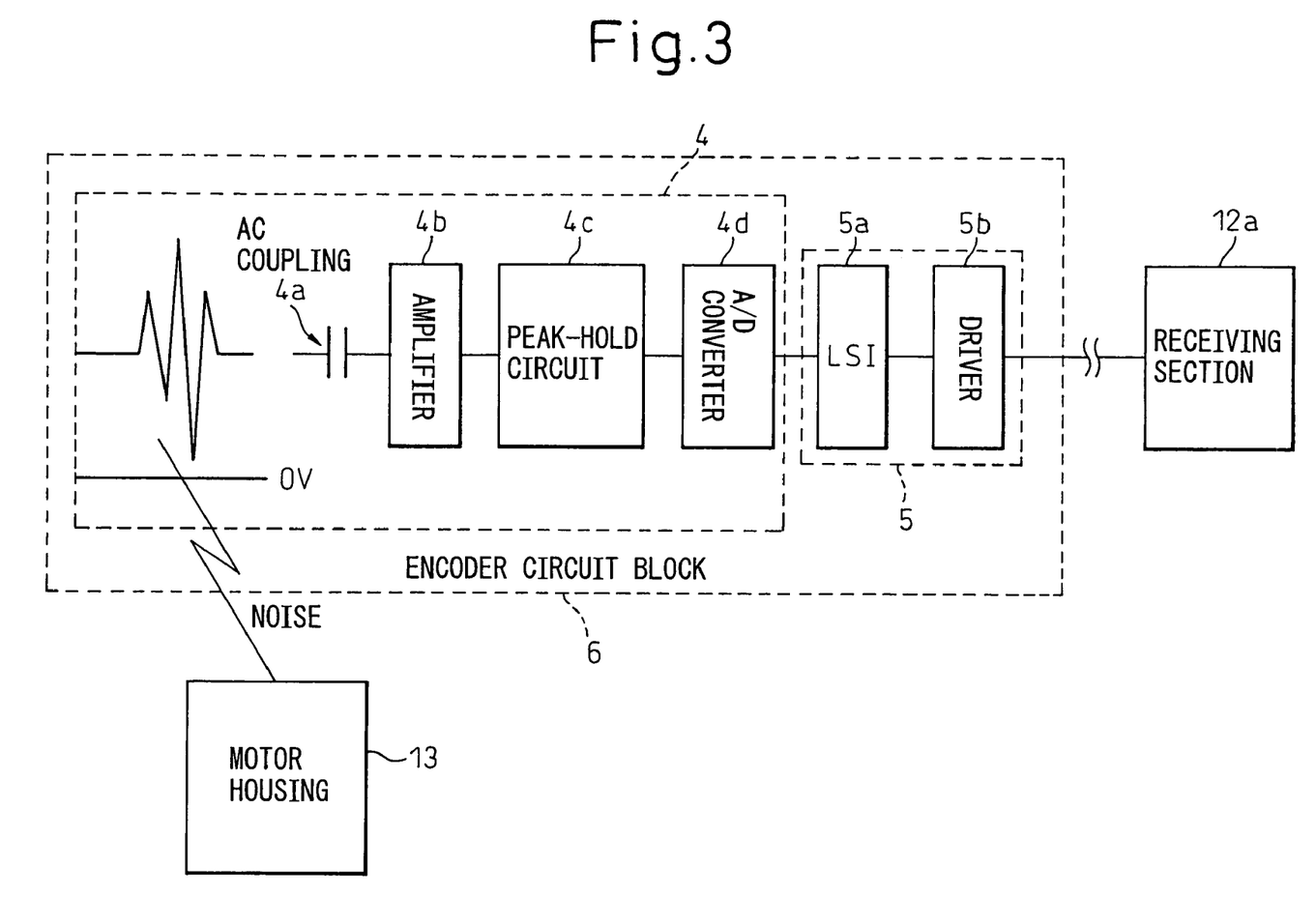
FIG. 3 is a schematic diagram for explaining one configuration example of a noise detecting means that transmits only a noise data signal.
Figure 4:
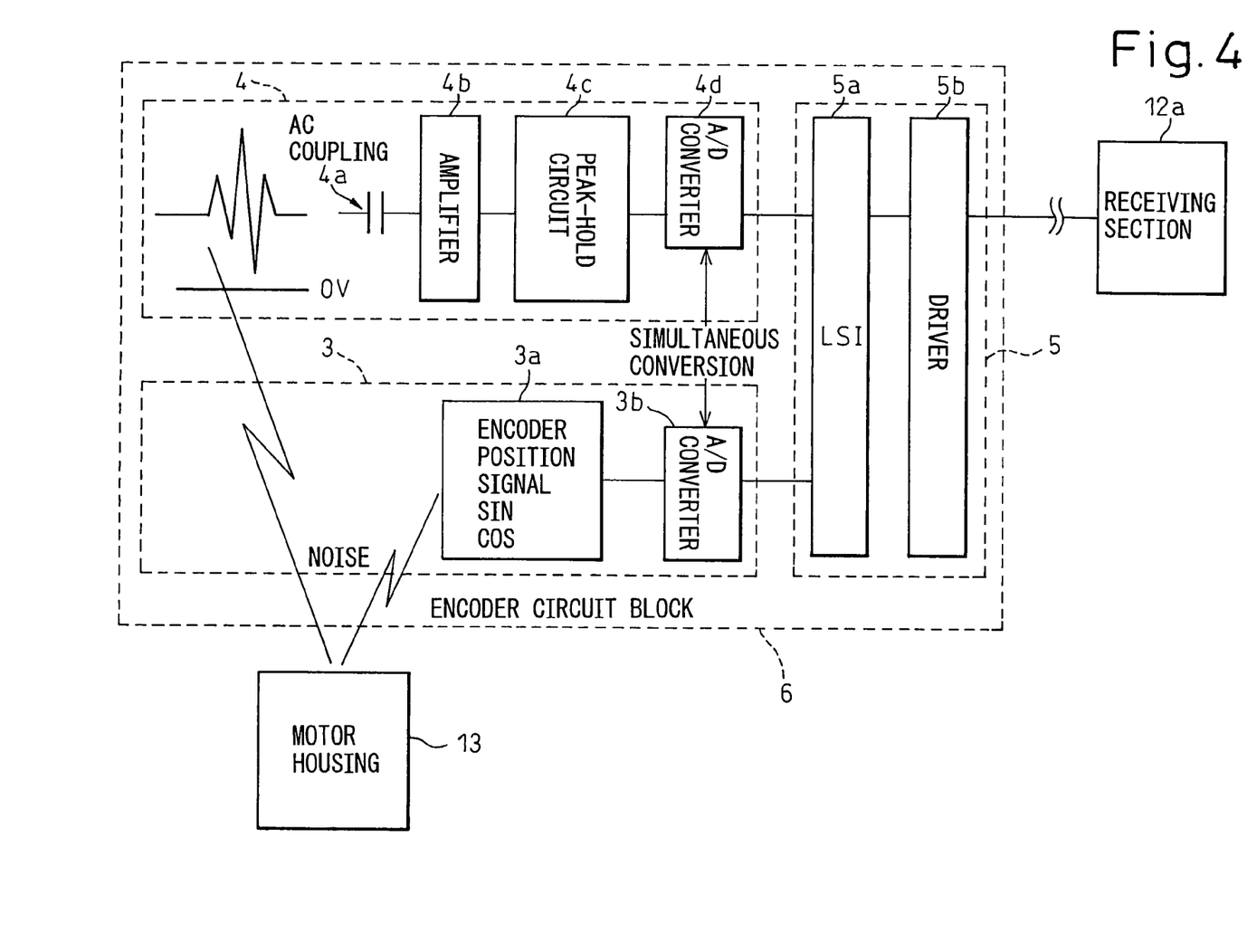
FIG. 4 is a schematic diagram for explaining one configuration example of a noise detecting means that transmits an encoder signal as well as a noise data signal.

FIGS. 3 and 4 are schematic diagrams for explaining configuration examples of the noise detecting means 4: FIG. 3 shows a configuration example when transmitting only the noise data signal, and FIG. 4 shows a configuration example when transmitting the encoder signal as well as the noise data signal.

In the example of FIG. 3, the noise detecting means 4 and the transmitting means 5 are shown mounted on the circuit board 6.

The noise detecting means 4 comprises: the coupling capacitor 4a which is connected to the line connecting between the movement detecting means 2 and the signal processing circuit 3 or the line formed on the circuit board 6, and which extracts an AC component from the movement detection signal or from the signal flowing along the line formed on the circuit board; an amplifier 4b which amplifies the signal of the extracted AC component; a peak-hold circuit 4c which holds a peak value of the amplified signal; and an A/D conversion circuit 4d which converts the peak value into a digital signal to obtain the noise level.

The transmitting means 5 transmits the noise level to a receiving section 12a in the control unit 12. The transmitting means 5 can be constructed using, for example, a signal processing LSI 5a and a transmitting driver 5b.

In the example of FIG. 4, the signal processing circuit 3, the noise detecting means 4, and the transmitting means 5 are shown mounted on the circuit board 6.

For the noise detecting means 4, the same configuration as that shown in FIG. 3 can be employed, and therefore, the description thereof will not be repeated here.

The signal processing circuit 3 comprises a position signal creating means 3a for creating, from the movement detection signal, a position signal expressed in the form of a sin signal or a cos signal, and an A/D conversion circuit 3b which converts the position signal into a digital signal to produce the encoder signal.

The transmitting means 5 can be constructed using a signal processing LSI 5a and a transmitting driver 5b; here, the LSI 5a creates a transmission signal by combining the noise level supplied from the noise detecting means 4 with the encoder signal supplied from the signal processing circuit 3, and transmits the noise level together with the encoder signal to the receiving section 12a of the control unit 12.

The LSI 5a creates the transmission signal by converting the encoder signal and the noise level, occurring at the same instant in time, into a serial signal. As a result, the receiving section 12a can acquire the encoder signal and the noise level occurring at the same instant in time.

Figure 5:
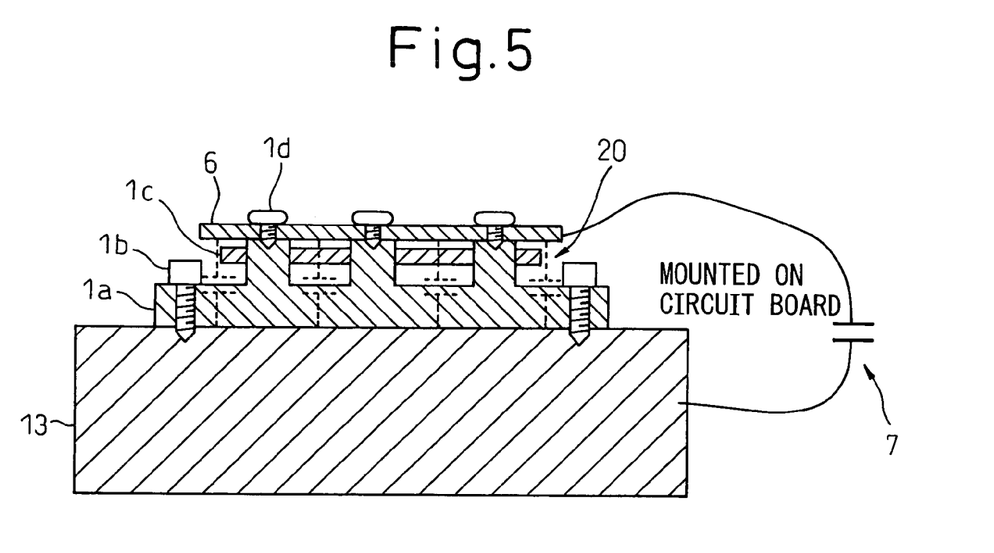
FIG. 5 is a schematic cross-sectional view for explaining how the encoder is mounted on a driving device.

FIG. 5 is a schematic cross-sectional view for explaining how the encoder is mounted on the driving device. In FIG. 5, the encoder is mounted on the driving device such as a motor by fixing an encoder flange 1a to the housing 13 with flange fixing screws 1b. The circuit board 6 is fixed to the encoder flange 1a with circuit board fixing screws 1d. A rotating slit 1c is mounted between the circuit board 6 and the encoder flange 1a.

Here, the encoder can be constructed so that the potential on the housing 13 is introduced into the circuit board 6 not only via a stray capacitance 20 but also via a capacitor 7 connected between the housing 13 and the circuit board 6. This capacitor 7 is mounted on the circuit board 6.

Figure 6:
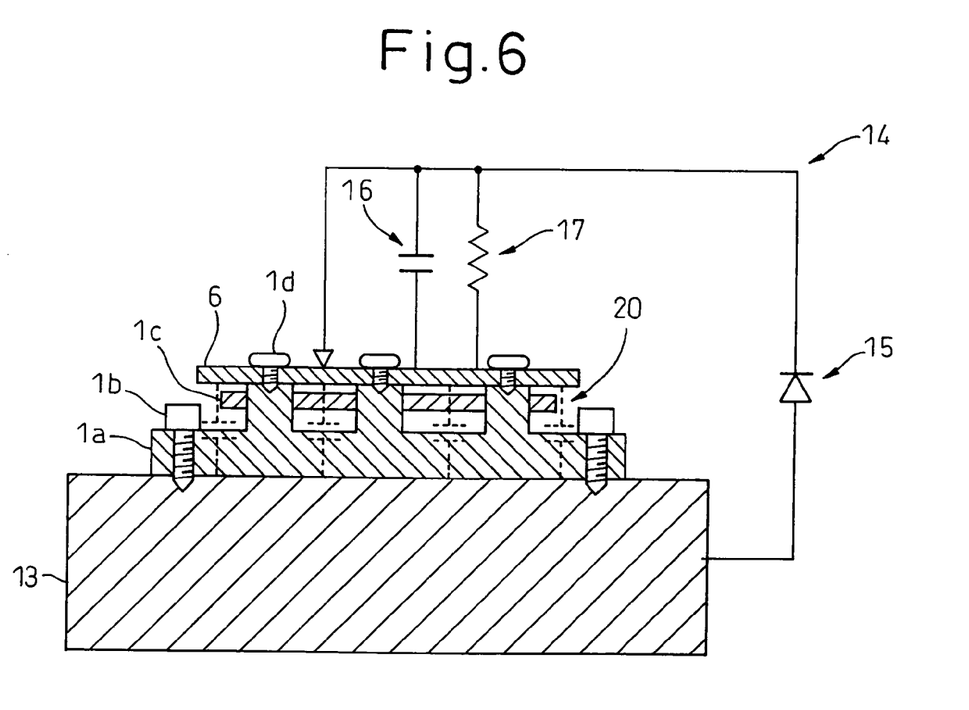
FIG. 6 is a schematic cross-sectional view for explaining an example in which a noise amount detection circuit is provided in the encoder.

FIG. 6 is a diagram showing a mounting example of a noise amount detection circuit. The noise amount detection circuit 14, which is mounted on the circuit board 6, is a circuit for roughly calculating the amount of noise introduced from the housing 13 into the circuit board 6, and is constructed by connecting a diode 15 in series to a parallel circuit of a capacitor 16 and a resistor 17.

The noise amount detection circuit 14 has a detecting function for extracting a crest of an AC signal. The noise generated in the housing 13 is converted into a value representing the crest of the noise as it is passed through the noise amount detection circuit 14, and the value is fed into the circuit board 6. In this way, the noise detecting means 4 can detect an amount equivalent to the amount of noise.

Figure 7A:
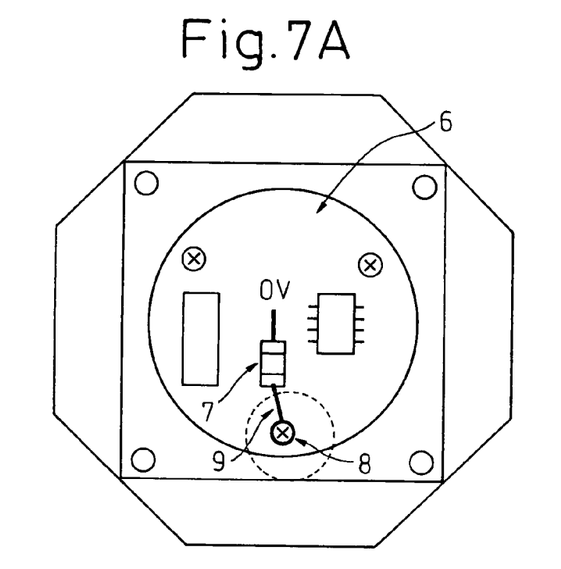
FIGS. 7A and 7B are diagrams for explaining a mounting example of a capacitor.
Figure 7B:
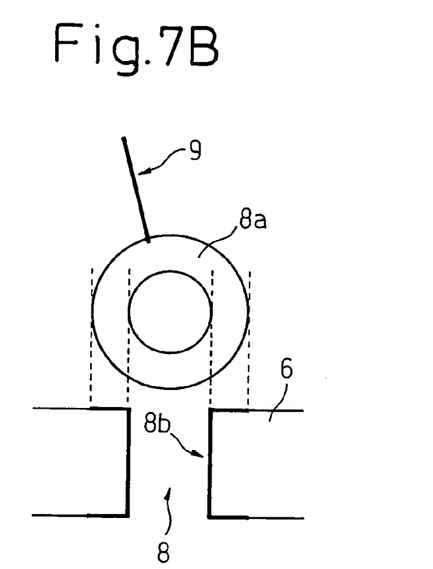

FIGS. 7A and 7B are diagrams for explaining a mounting example of the capacitor 7: FIG. 7A is a top plan view of the circuit board 6, and FIG. 7B is a cross-sectional view of a portion of the circuit board 6.

A plated through hole 8 is formed in the circuit board 6 on which the capacitor 7 is mounted. One end of the capacitor 7 is connected to a 0-V potential point on the circuit board 6, while the other end is connected to an upper plated portion 8a of the plated through hole 8 via a connecting lead 9. The plated through hole 8 is a hole opened from the top through to the bottom of the circuit board 6, and its upper plated portion 8a and plated sidewall portions 8b are plated with metal, forming an electrical conductive path passing through the circuit board 6.

One of the circuit board fixing screws 1d is screwed into the plated through hole 8 to fix the circuit board 6 to the encoder flange 1a. In this way, the circuit board 6 is electrically connected to the encoder flange 1a via the capacitor 7, the connecting lead 9, and the upper plated portion 8a and plated sidewall portions 8b of the plated through hole 8.

The noise amount detection circuit of FIG. 6 can be mounted on the circuit board 6, like the capacitor shown in FIGS. 7A and 7B.

For the movement detecting means 2 used in the encoder of the present invention, use can be made of a detection device of any desired type, for example, an optical type or a magnetic type.

Figure 8:
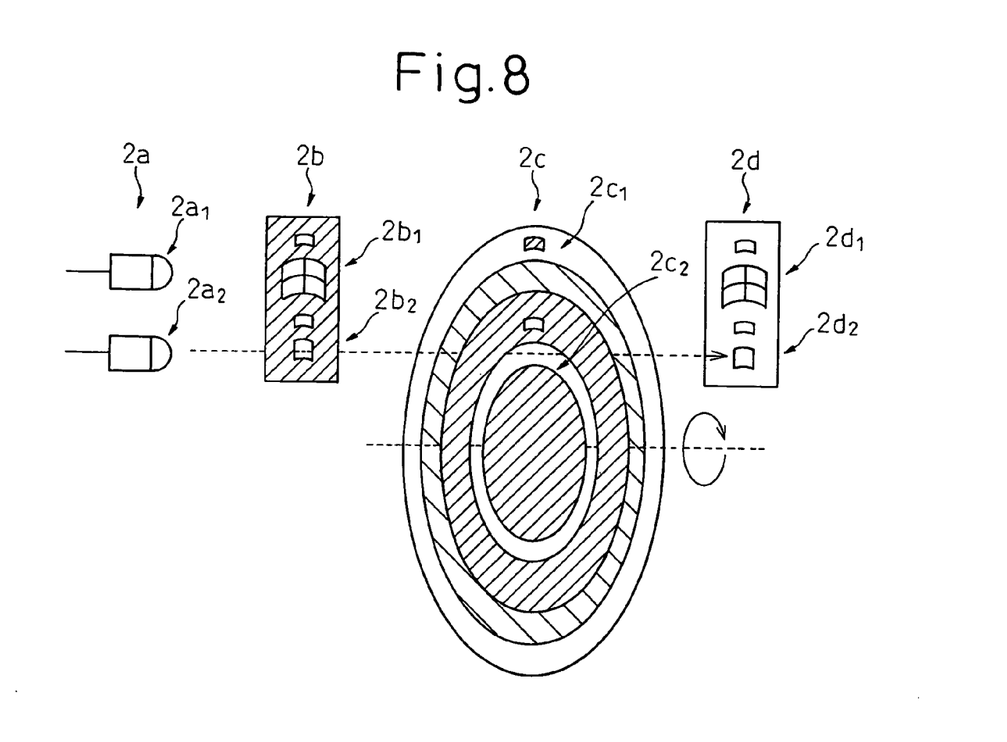
FIG. 8 is a schematic diagram for explaining one example of an optical-type movement detecting means.

FIG. 8 is a schematic diagram for explaining one example of an optical-type movement detecting means incorporating a noise-measuring detection device.

In FIG. 8, the movement detecting means includes a light emitting device 2a, a slit (code disk) 2b, 2c, and a light receiving device 2d. The light emitting device 2a comprises a position-detecting LED 2a1 and a noise-measuring LED 2a2. The slit comprises a fixed slit 2b and a rotating slit 2c; the fixed slit 2b includes a position-detecting split portion 2b1 and a noise-measuring slit portion 2b2, and the rotating slit 2c includes a position-detecting split portion 2c1 and a noise-measuring slit portion 2c2. The light receiving device 2*d* comprises a position-detecting light receiving device 2*d*1 and a noise-measuring light receiving device 2*d*2. The fixed slit 2*b* and the rotating slit 2*c* can be provided with a reference slit for detecting a reference position.

Light emitted from the position-detecting LED 2*a*1 is transmitted through or blocked (or reflected) by the slit depending on the positional relationship between the position-detecting split portion 2*b*1 and the position-detecting split portion 2*c*1, and the thus modulated light is detected by the position-detecting light receiving device 2*d*1; in this way, the position of the moving body can be detected from the rotational position of the rotating slit 2*c*.

On the other hand, light emitted from the noise-measuring LED 2*a*2 is transmitted through the noise-measuring slit portion 2*b*2 and through the noise-measuring slit portion 2*c*2, and is detected by the noise-measuring light receiving device 2*d*2. In the rotating slit 2*c*, the noise-measuring slit portion 2*c*2 is formed so as to always direct the light to the noise-measuring light receiving device 2*d*2, which thus receives the light emitted from the noise-measuring LED 2*a*2, irrespective of the rotational position of the rotating slit 2*c*.

Figure 9:
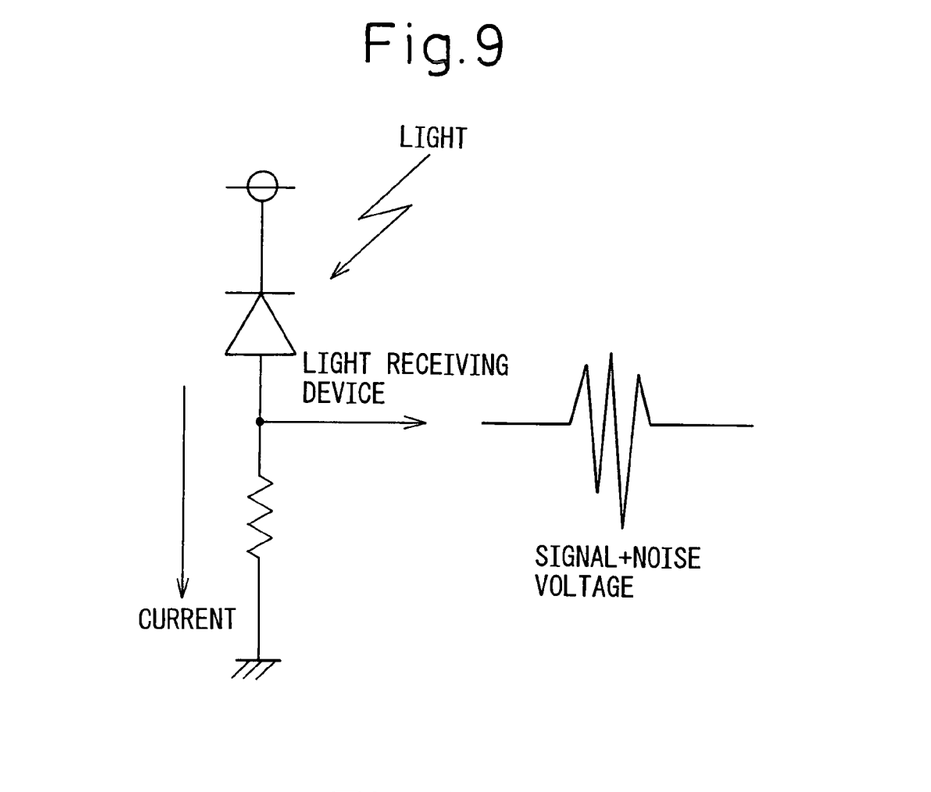
FIG. 9 is a diagram for explaining an output signal that a light receiving device produces.

FIG. 9 is a diagram for explaining an output signal that the light receiving device produces. The photocurrent produced by the photodiode is detected as a voltage signal. The voltage signal contains the detection signal plus the noise component superimposed on it. The noise component occurs independently of the current that the light receiving device produces by receiving light, and the same noise component is superimposed in the position-detecting light receiving device 2*d*1 as in the noise-measuring light receiving device 2*d*2.

Accordingly, the detection signal from the noise-measuring light receiving device 2*d*2 represents the noise component contained in the detection signal from the position-detecting light receiving device 2*d*1. The noise level can thus be calculated based on the output of the noise-measuring light receiving device 2*d*2.

Figure 10:
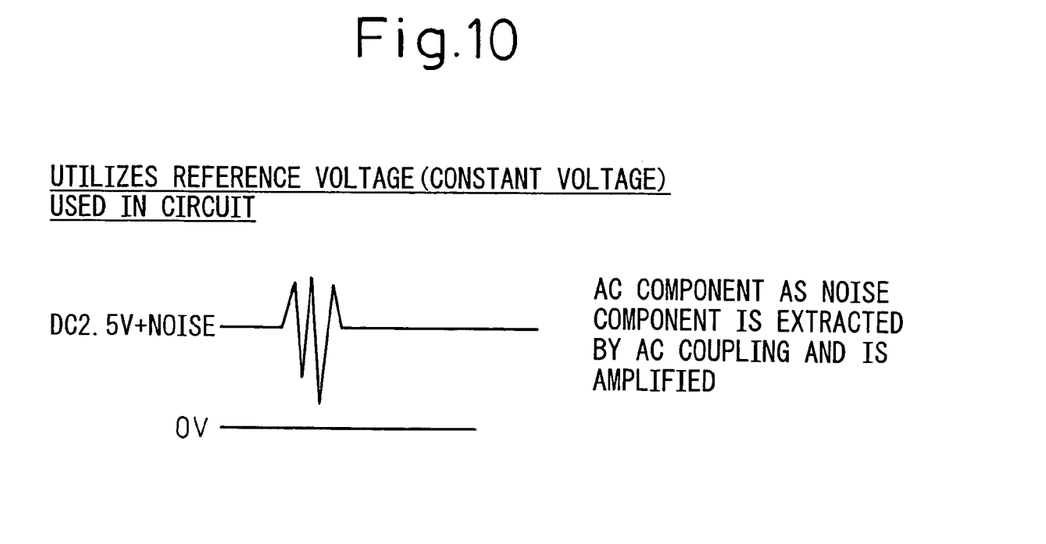
FIG. 10 is a diagram for explaining a noise component on a line.

On the other hand, on a line connected to a potential of a constant voltage, such as a reference voltage, on the circuit board, the AC component superimposed on the constant voltage can be regarded as the noise component. FIG. 10 is a diagram for explaining the noise component on the line; for example, the AC component superimposed on a constant DC voltage of 2.5 V can be regarded as the noise component, and the noise component can be extracted by passing the signal through the coupling capacitor.

The present invention can be applied not only to optical encoders but also to magnetic encoders, and is not restricted by the type of the movement detecting means.

Further, the invention can be applied not only to incremental encoders which measure relative amount such as revolutions or the amount of movement by counting signals, but also to absolute encoders which measure absolute position such as rotational angle or moving position.

The invention can also be applied to rotary encoders which measure rotational position or the amount of rotation and linear encoders which measure moving position or the amount of movement along a straight line.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An encoder incorporating within the same apparatus:
   movement detecting means for detecting movement of a moving body;
   a signal processing circuit for processing a movement detection signal supplied from said movement detecting means, and thereby producing an encoder signal representing the position and/or the amount of displacement of said moving body; and
   noise detecting means for detecting noise superimposed on said movement detection signal, wherein said noise detecting means detects noise level by extracting noise induced in a circuit board on which said signal processing circuit is mounted.

2. An encoder as claimed in claim 1, wherein said noise detecting means includes:
   a coupling capacitor, connected to an arbitrary signal line on said circuit board, for extracting an AC component from a signal output on said signal line; and
   an A/D conversion circuit for obtaining said noise level from said extracted AC component.

3. An encoder as claimed in claim 2, further comprising transmitting means for transmitting an output of said noise detecting means and/or an output of said signal processing circuit to a control unit for a driving device that drives said moving body.

4. An encoder as claimed in claim 2, wherein a capacitor is connected between said circuit board and a driving device that drives said moving body.

5. An encoder as claimed in claim 2, wherein a noise amount detection circuit is connected between said circuit board and a driving device that drives said moving body.

6. An encoder as claimed in claim 1, wherein a capacitor is connected between said circuit board and a driving device that drives said moving body.

7. An encoder as claimed in claim 1, wherein a noise amount detection circuit is connected between said circuit board and a driving device that drives said moving body.

8. An encoder as claimed in claim 1, further comprising transmitting means for transmitting an output of said noise detecting means and/or an output of said signal processing circuit to a control unit for a driving device that drives said moving body.

9. An encoder incorporating within the same apparatus:
   movement detecting means for detecting movement of a moving body;
   a signal processing circuit for processing a movement detection signal supplied from said movement detecting means, and thereby producing an encoder signal representing the position and/or the amount of displacement of said moving body; and
   noise detecting means for detecting noise superimposed on said movement detection signal, further comprising transmitting means for transmitting an output of said noise detecting means and/or an output of said signal processing circuit to a control unit for a driving device that drives said moving body.

10. An encoder as claimed in claim 9, wherein the output of said noise detecting means and the output of said signal processing circuit are data occurring at the same instant in time.

11. An encoder incorporating within the same apparatus:
    movement detecting means for detecting movement of a moving body;

a signal processing circuit for processing a movement detection signal supplied from said movement detecting means, and thereby producing an encoder signal representing the position and/or the amount of displacement of said moving body; and noise detecting means for detecting noise superimposed on said movement detection signal, wherein said movement detecting means includes a light emitting device, a code disk which transmits or reflects light emitted from said light emitting device, and a light receiving device which receives the light transmitted through or reflected by said code disk and outputs a light detecting signal, wherein said light receiving device includes a noise-level-measuring light receiving device for calculating noise level.

12. An encoder incorporating within the same apparatus:

movement detecting means for detecting movement of a moving body;

a signal processing circuit for processing a movement detection signal supplied from said movement detecting means, and thereby producing an encoder signal representing the position and/or the amount of displacement of said moving body; and noise detecting means for detecting noise superimposed on said movement detection signal, wherein said noise detecting means detects noise level by extracting the noise superimposed on said movement detection signal from said movement detection signal;

further comprising transmitting means for transmitting an output of said noise detecting means and/or an output of said signal processing circuit to a control unit for a driving device that drives said moving body.

13. An encoder incorporating within the same apparatus:

movement detecting means for detecting movement of a moving body;

a signal processing circuit for processing a movement detection signal supplied from said movement detecting means, and thereby producing an encoder signal representing the position and/or the amount of displacement of said moving body; and noise detecting means for detecting noise superimposed on said movement detection signal; wherein said noise detecting means includes: a coupling capacitor, connected to a signal line connecting between said movement detecting means and said signal processing circuit, for extracting an AC component from said movement detection signal; and an A/D conversion circuit for obtaining said noise level from said extracted AC component, further comprising transmitting means for transmitting an output of said noise detecting means and/or an output of said signal processing circuit to a control unit for a driving device that drives said moving body.

* * * * *